United States Patent
Huang

(10) Patent No.: US 9,039,059 B2
(45) Date of Patent: May 26, 2015

(54) VACUUM-LIFTING DEVICE FOR ASSEMBLING AND TESTING OPTICAL CONNECTOR

(71) Applicant: HON HAI PRECISION INDUSTRY CO., LTD., New Taipei (TW)

(72) Inventor: Hsin-Shun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 13/958,614

(22) Filed: Aug. 5, 2013

(65) Prior Publication Data
US 2014/0353996 A1    Dec. 4, 2014

(30) Foreign Application Priority Data
May 31, 2013   (TW) .............................. 102119517 A

(51) Int. Cl.
B25J 15/06    (2006.01)
(52) U.S. Cl.
CPC .................................. B25J 15/0616 (2013.01)
(58) Field of Classification Search
CPC .......................... B25J 15/0616; H01L 21/6838
USPC ................. 294/65, 183, 185, 189; 414/752.1; 29/743; 901/40
See application file for complete search history.

(56) References Cited

U.S. PATENT DOCUMENTS

| | | | | |
|---|---|---|---|---|
| 1,110,409 | A * | 9/1914 | Sutherland, Jr. | 294/65 |
| 5,152,566 | A * | 10/1992 | Blatt et al. | 294/81.2 |
| 6,161,886 | A * | 12/2000 | Furuya et al. | 294/183 |
| 7,004,522 | B2 * | 2/2006 | Nagai et al. | 294/185 |
| 2002/0036411 | A1 * | 3/2002 | Quick et al. | 294/64.1 |
| 2002/0060464 | A1 * | 5/2002 | Bendat et al. | 294/64.1 |
| 2002/0088113 | A1 * | 7/2002 | Hwang | 29/743 |
| 2006/0125257 | A1 * | 6/2006 | Liang | 294/64.1 |

* cited by examiner

Primary Examiner — Dean Kramer
(74) Attorney, Agent, or Firm — Novak Druce Connolly Bove + Quigg LLP

(57) ABSTRACT

A vacuum-lifting device includes a holding block and a nozzle. The holding block defines a holding hole and a threaded hole communicating with the holding hole. The nozzle includes a first section that is slidably received in the holding hole and a second section. The second section extends from the first section and has an outer diameter smaller than an outer diameter of the first section.

7 Claims, 4 Drawing Sheets

VACUUM-LIFTING DEVICE FOR ASSEMBLING AND TESTING OPTICAL CONNECTOR

BACKGROUND

1. Technical Field

The present disclosure relates to optical connectors, and particularly to a vacuum-lifting device for assembling and facilitating testing of optical connectors.

2. Description of Related Art

Optical connectors include a printed circuit board, a photoelectric element, and a lens element. The lens element includes a lens. In assembly, the photoelectric element and the lens element are held by a vacuum-lifting device, such as a vacuum nozzle, and placed onto the printed circuit board in sequence. The lens element covers the photoelectric element. The lens is aligned with the photoelectric element, such that the photoelectric element can emit or receive light via the lens with optimal efficiency. To ensure high quality, testing is conducted by image recognition or optical/electric signal processing to determine if an alignment between the lens and the photoelectric element is acceptable. However, a shadow projection of the vacuum-lifting device onto the lens will adversely affect an accuracy of the image recognition and signal processing.

Therefore, it is desirable to provide a vacuum-lifting device that can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
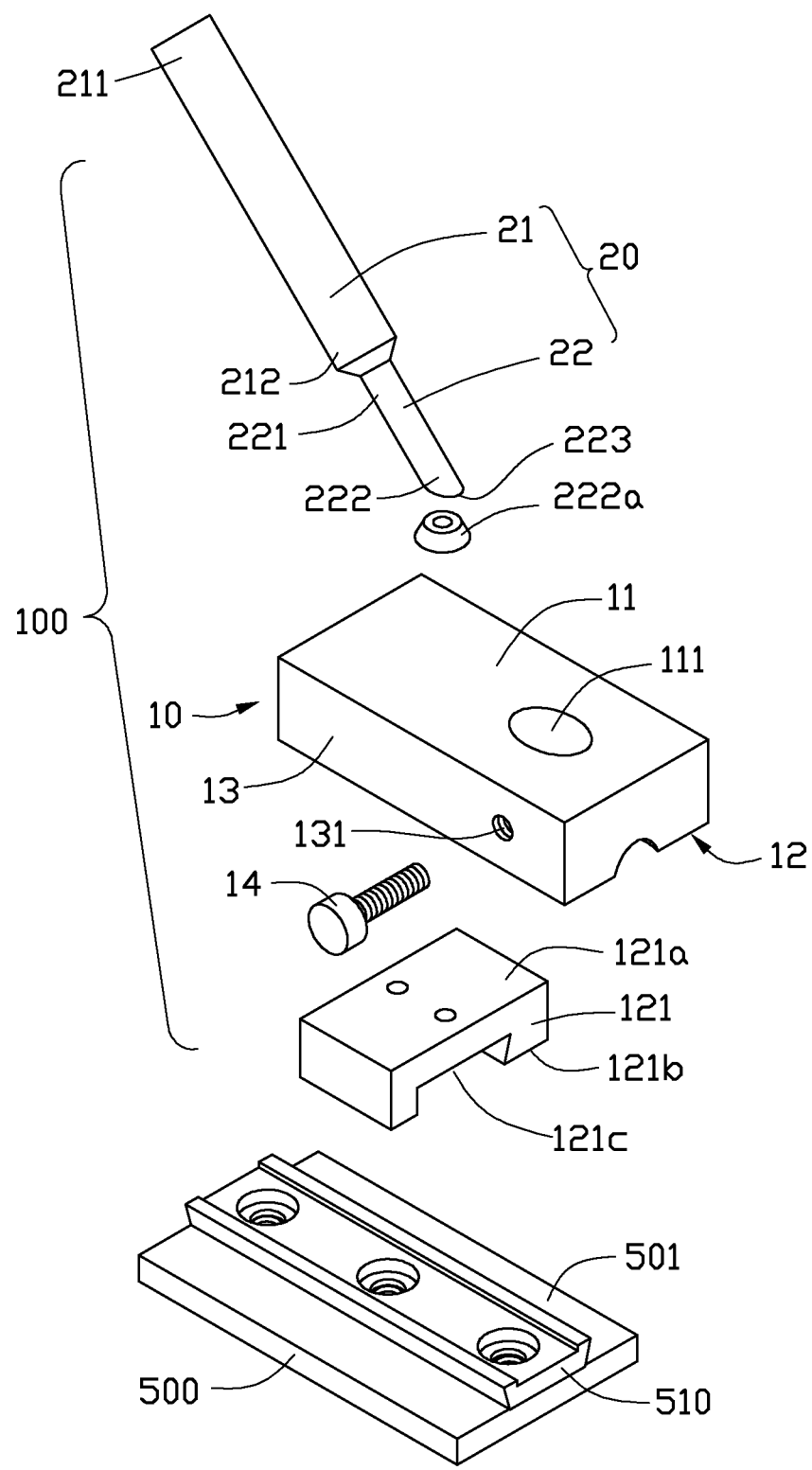
FIG. 1 is an exploded isometric view of a vacuum-lifting device, according to an embodiment.

FIG. 1 shows a vacuum-lifting device 100, according to an embodiment. The vacuum-lifting device 100 includes a holding block 10 and a nozzle 20.

The holding block 10 is substantially rectangular and includes a top surface 11, a bottom surface 12 opposite to the top surface 11, and a side surface 13 perpendicularly connected between the top surface 11 and the bottom surface 12. The holding block 10 defines a holding hole 111 extending along a direction that is slanted about 45 degrees relative to the top surface 11 and the bottom surface 12. The holding block 10 also defines a threaded hole 131 in the side surface 13. The threaded hole 131 communicates with the holding holes 111. The holding device 10 also includes a screw 14.

The nozzle 20 includes a first section 21 and a second section 22, both of which are tubular. The first section 21 includes a first end 211 and a second end 212 opposite to the first end 211. The first end 211 is connected to a vacuum pump (not shown) to maintain a low air pressure. The second section 22 is integrally formed with the first section 21 and extends collinearly from the second end 212. The second section 22 includes a third end 221 connected to the second end 212, and a fourth end 222 opposite to the third end 221. An outer diameter of the first section 21 is greater than an outer diameter of the second section 22, but is slightly smaller than a diameter of the holding hole 111. The fourth end 222 has an end surface 223 that tapers at a 45 degree angle relative to a longitudinal direction of the second section 22. The end surface 223 functions as a holding surface for holding objects, such as a lens element 200 (see FIG. 4). To prevent damage to the objects, a buffer ring 222a is attached to the end surface 223. The buffer ring 222a can be made of rubber.

Figure 2:
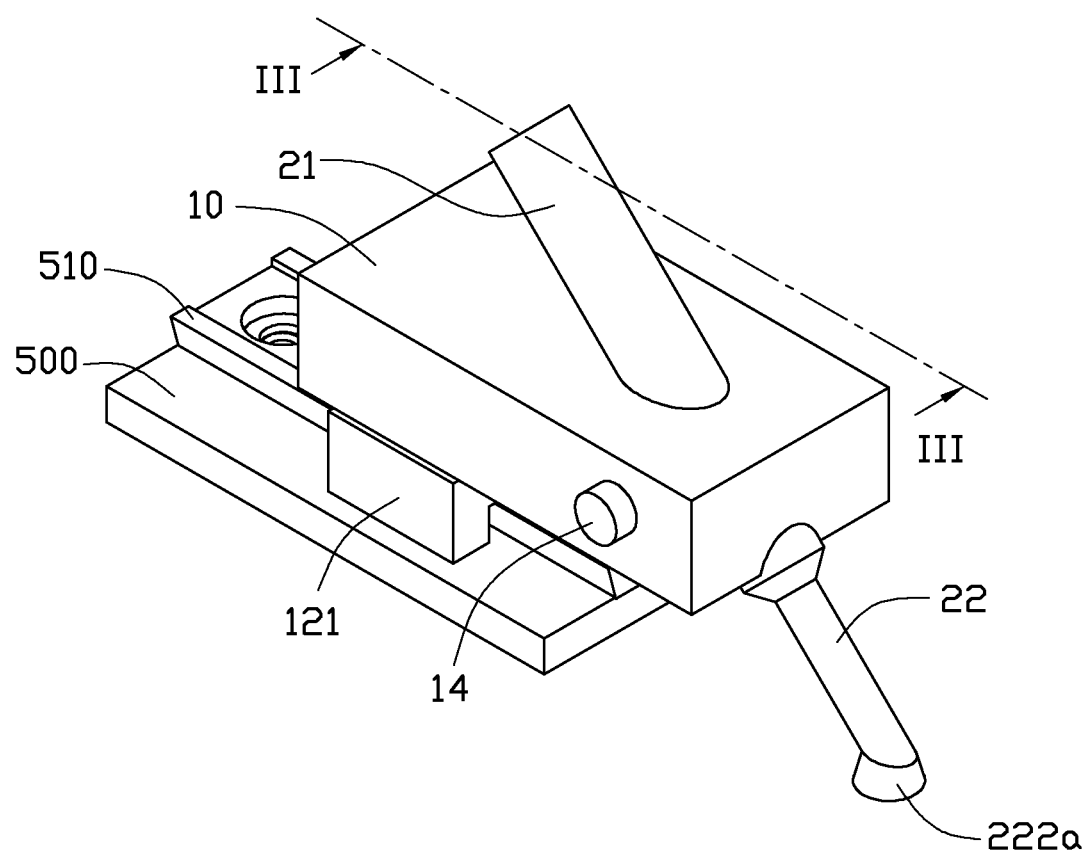
FIG. 2 is an isometric view of the vacuum-lifting device of FIG. 1.
Figure 3:
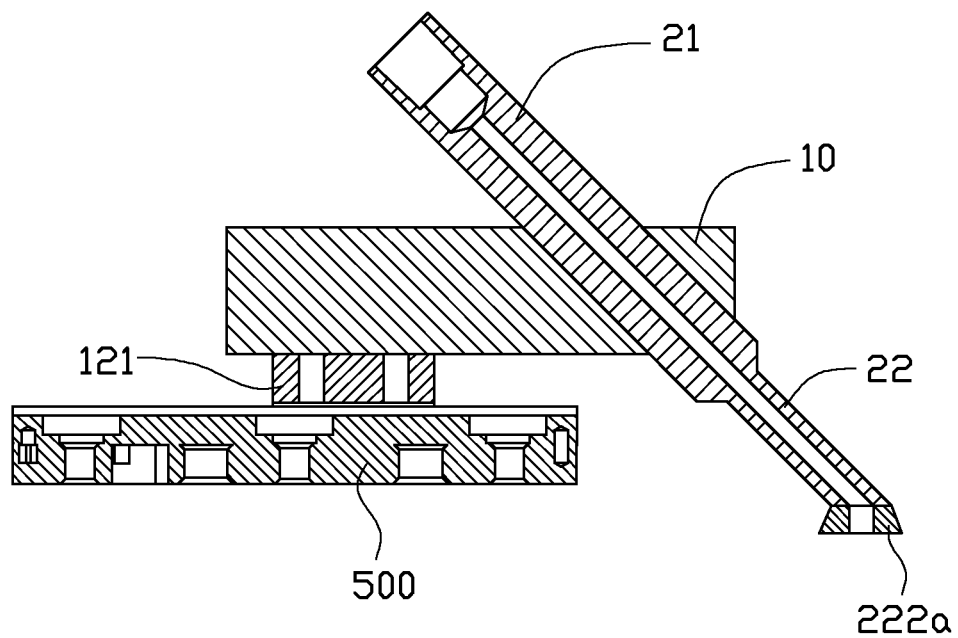
FIG. 3 is a cross-sectional view taken along a line III-III of FIG. 2.
Figure 4:
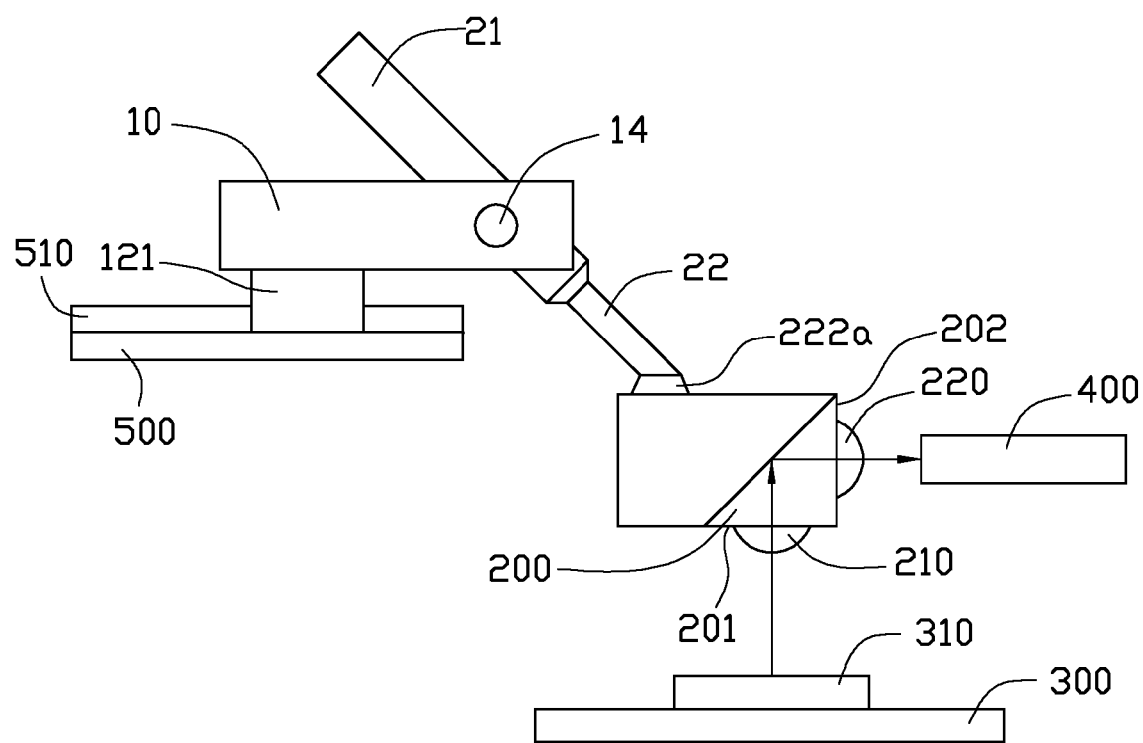
FIG. 4 is a plan view of the vacuum-lifting device of FIG. 1 in operation.

Also referring to FIGS. 2-4, in assembly and operation, the nozzle 20 is inserted through the holding hole 111. The nozzle 20 lifts the lens element 200 via the holding surface 223 and the buffer ring 222a. In this embodiment, the lens element 200 is substantially rectangular and includes a lower surface 201 and a sidewall 202 perpendicularly connected to the lower surface 201. The lens element 200 includes a first lens 210 on the lower surface 201 and a second lens 220 on the sidewall 202. The first lens 210 and the second lens 220 efficiently couple a photoelectric element 310, which is positioned on a printed circuit board 300, to an optical fiber 400. The nozzle 20 is slid along the holding hole 111 to move the lens element 200 until the first lens 210 is aligned with the photoelectric element 310, and the second lens 220 is aligned with the optical fiber 400. Then, the screw 14 is screwed into the threaded hole 131 to abut the first section 21 and fix the nozzle 20 in the through hole 111. Next, testing alignment of the photoelectric element 310 and the optical fiber 400 with their respective lenses can be carried out.

The first section 21 of the nozzle 20 is efficiently fixed in the holding hole 111 due to the larger diameter of the first section 21, while a shadow projection of the nozzle 20 on the first lens 210 is effectively reduced due to the smaller diameter of the second section 22. In addition, as the second section 22 is further tilted relative to the lower surface 201, the shadow projection of the nozzle 20 onto the first lens 210 is further reduced. As such, accuracy of testing the lens element 200 is improved.

The vacuum-lifting device 100 can further include a base 500 and a sliding block 121.

The base 500 is substantially rectangular and includes an upper surface 501 and a rail 510, which extends along a lengthwise direction of the base 500, and has a trapezoidal cross-section in this embodiment.

The sliding block 121 is also rectangular and includes a first surface 121a and a second surface 121b opposite to the first surface 121a. The sliding block 121 defines an engaging groove 121c in the second surface 121b.

In assembly, the sliding block 121 is slidably fixed to the base 500 by slidable engagement between the rail 510 and the engaging groove 121c. Thus, the sliding block 121 is slidable along the rail 510. Then, the holding block 10 is fixed to the sliding block 121, wherein the bottom surface 12 is connected to the first surface 121a. As such, the vacuum-lifting device 10 can further move the lens element 200 by sliding via the sliding block 121.

It will be understood that the above particular embodiments are shown and described by way of illustration only. The principles and the features of the present disclosure may be employed in various and numerous embodiments thereof without departing from the scope of the disclosure. The above-described embodiments illustrate the possible scope of the disclosure but do not restrict the scope of the disclosure.

What is claimed is:

1. A vacuum-lifting device, comprising:
a holding block defining a holding hole and a threaded hole communicating with the holding hole; and
a nozzle comprising a first section and a second section, the first section slidably received in the holding hole, the second section collinearly extending from the first section and having an outer diameter smaller than an outer diameter of the first section, the holding block further comprising a screw screwing into the threaded hole to abut the nozzle and thus fixing the nozzle in the holding hole;
wherein the holding block is substantially rectangular and comprises a top surface, a bottom surface opposite to the top surface, and a side surface perpendicularly connecting the top surface and the bottom surface, the holding hole extends through the top surface and the bottom surface along a direction that is slanted about 45 degrees relative to the top surface.

2. The vacuum-lifting device of claim 1, wherein the threaded hole is defined in the side surface.

3. The vacuum-lifting device of claim 1, wherein an end of the second section opposite to the first section tapers at a 45-degree angle relative to a longitudinal direction of the second section to form a holding surface for holding objects.

4. The vacuum-lifting device of claim 3, wherein the nozzle comprises a buffer ring attached to the holding surface.

5. The vacuum-lifting device of claim 4, wherein the buffer ring is made of rubber.

6. The vacuum-lifting device of claim 1, further comprising a base and a sliding block, the sliding block being slidably fixed on the base, the holding block being fixed to the sliding block.

7. A vacuum-lifting device, comprising:
a holding block defining a holding hole and a threaded hole communicating with the holding hole;
a nozzle comprising a first section and a second section, the first section slidably received in the holding hole, the second section collinearly extending from the first section and having an outer diameter smaller than an outer diameter of the first section, the holding block further comprising a screw screwing into the threaded hole to abut the nozzle and thus fixing the nozzle in the holding hole;
a base; and
a sliding block, the sliding block being slidably fixed on the base, the holding block being fixed to the sliding block;
wherein the base is substantially rectangular and comprises an upper surface and a rail, the rail extends along a lengthwise direction of the base and has a trapezoidal cross-section, the sliding block is also rectangular and comprises a first surface, to which the holding block fixed, and a second surface opposite to the first surface, the sliding block defines an engaging groove in the second surface, the sliding block is fixed on the base by engagement between the engaging groove and the rail.

* * * * *